Patented Feb. 3, 1953

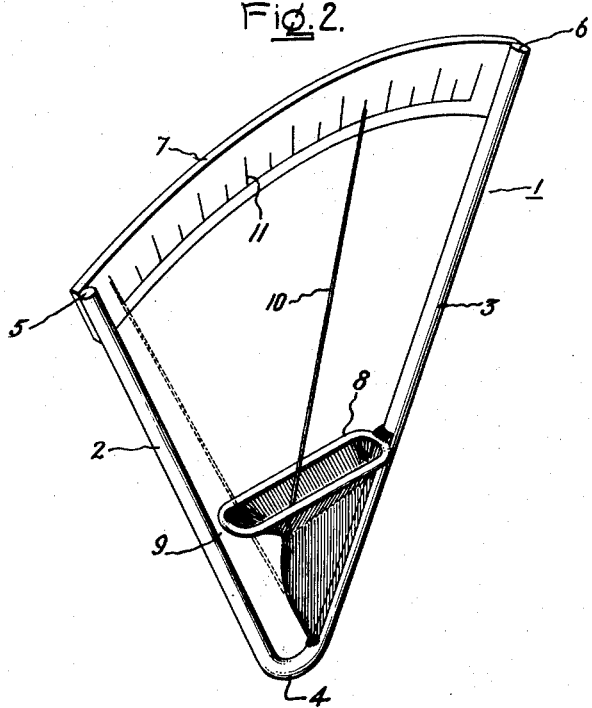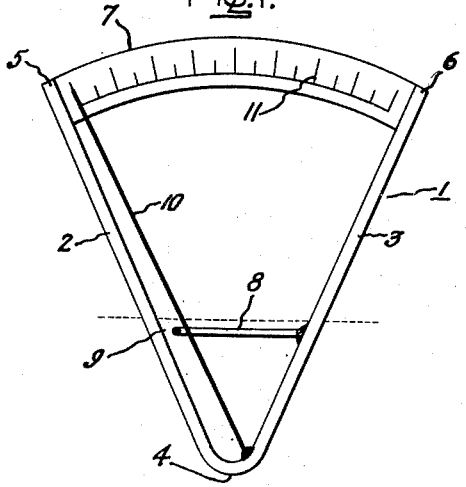

2,627,177

UNITED STATES PATENT OFFICE 2,627,177

SURFACE TENSION MEASURING DEVICE

Bernard Vonnegut, Alplaus, N. Y., assignor to General Electric Company, a corporation of New York Application September 29, 1951, Serial No. 248,894

3 Claims. (Cl. 73—53)

My invention relates to an instrument for measuring the surface tension of a liquid. More particularly, my invention relates to a tensiometer in which the surface tension of the liquid being measured acts directly upon a movable member which indicates the surface tension.

According to the usual methods of measuring surface tension of a liquid, such as the dipping ring method, the capillary rise method, and the bubble pressure method, instruments are used which have certain limitations. For instance such equipment is often difficult to set or adjust, and is not well adapted to measurement of surface tension of certain liquids.

One object of my invention is to make an extremely simple instrument for measuring surface tension. Another object of my invention is to design an instrument which is easy to use and which is accurate in its indications. A further object of my invention is to make a tensiometer in such form that it may be used to measure the surface tension of liquids formerly difficult to measure. Another object is to design a tensiometer which may be set or adjusted very easily.

The principal objects of my invention are met by forming a rigid open framework within which is mounted a highly flexible movable filament. When the frame with its filament is dipped into a liquid to be tested, and withdrawn, the movable filament will be deflected by the surface tension of the film formed between the frame and the filament, and movement of the filament can be read directly upon an appropriate scale.

Other objects and further details of that which I believe to be novel and my invention will be clear from the following description and claims taken with the accompanying drawing in which is illustrated an example of tensiometer embodying the present invention and incorporating the open frame and movable filament. In the drawing, Fig. 1 is a front view of an instrument according to my invention, the horizontal dotted line indicating the surface level of a liquid to be tested, and Fig. 2 is perspective view of the instrument of Fig. 1 showing a liquid film in a portion of the instrument as it might appear when the instrument is in use.

The principal part of a tensiometer according to the drawing is an open rigid frame 1 formed from a piece of relatively heavy gauge round wire bent in the form of a V. The V is, therefore, composed of a pair of arms 2 and 3, joined together at the apex 4 and with free ends 5 and 6 spaced apart from each other. The tops of the arms of the V are joined by a third arm, shown here as an arcuately shaped plate 7 which is suitably secured between the ends 5 and 6. It will be noted that the complete frame forms roughly a triangle extending in a single plane. The members of this triangular frame may be made of metal or glass or other suitable material which is substantially rigid.

Secured to one arm of the V, shown here as the arm 3, and at about a centimeter or two above the apex 4, is a rigid elongated film loop 8, which may also be of metal or glass or other suitable material. This film loop lies in a plane normal to the plane of the triangular frame, and is generally parallel to an imaginary line joining the ends of the arms of the V. Although it is secured to the arm 3 of the frame, it is spaced from the opposite arm 2 as at the point 9, for purposes which will appear later, depending upon the materials from which the instrument is made, the parts so far described may be brazed, welded, soldered, cemented, or otherwise firmly secured together. The longest dimension of the loop 8 lies in the general plane of the frame.

Secured to the frame firmly near the base of the V, and extending generally in a direction parallel to the arm 2 is an indicator filament 10. This filament is a slender, extremely flexible but resilient spring wire or quartz fiber which is sensitive enough to be moved by the surface tension of a liquid touching it. This filament extends through the film loop 8 without touching the loop, and the free end of the indicator filament lies opposite a graduated scale 11 on the arcuate segment plate 7 of the frame. I have found that a quartz fiber of several thousandths of an inch in diameter works well in an instrument having a loop about an eight of an inch wide and about one inch long, the base of the filament being mounted about an inch below the plane of the loop. This filament is the only moving active element of the instrument when it is used as described below.

In using this instrument the frame is picked up by hand near the upper end of one of its arms, and the apex of the frame is dipped into a liquid to be tested, to a depth such that the liquid covers the loop 8 as indicated by the dotted line in Fig. 1. The instrument is then withdrawn carefully from the liquid and a first film will be found to have formed in the loop 8. A second film, generally at right angles to the average plane of the first film will have formed in the space bounded by the arm 3 of the instrument, the indicator filament, and the first film. The films are indicated in Fig. 2. There will be no film between the indicator filament and the arm 2 because the loop is not in contact with that arm at the space 9, and there will be no support for a film at that point. The first film in the loop acts to support the second and larger film between the filament and the arm 3 but does not interfere with motion of the filament. The surface tension of the liquid in the larger film exerts a force on the flexible fiber and causes this filament to bend. The free end of the filament, located opposite the scale, will indicate the amount of bending or deflection which is produced by the surface tension of the second film. The amount of deflection is a function of the surface tension which may be quantitatively shown by appropriate indices on the scale. The unstressed position of the filament is shown in dotted lines in Fig. 2.

Obviously, the response of the device is a function of the orientation of the loop with respect to the resilient filament. As shown, the filament is one side of an approximately isosceles triangle in which the loop is the base. A line bisecting the angle between the filament and the arm 3 when the filament is unstressed will, therefore, be substantially perpendicular to the plane of the loop and the resultant film in the loop. By changing the orientation of the loop with respect to the filament, or by changing the shape of the loop, the instrument can be made more or less sensitive to different surface tensions and the scale can be either expanded or contracted to fit any desired need. For example, by proper proportioning and positioning of the loop and filament, the tensiometer may be designed so that a full scale deflection of the end of the filament would correspond to a change of only a few dynes in surface tension.

A desirable feature of this instrument is that any measurement of surface tension made with it is not liable to errors caused by uncertainty in contact angle. If the contact angle of the film is less than zero, no measurement is possible because the liquid pulls away from the instrument at the edges of the film which is being measured.

Readings of the instrument are more easily made and the liquid film lasts longest if the instrument is placed horizontally on a table for readings. In a horizontal position, the film does not drain off as rapidly as it might if the frame were held vertically.

When measuring highly volatile liquids, it is desirable to manipulate and read the instrument within a closed chamber having appropriate observation ports, so that the film will be in equilibrium with its saturated vapor within the closed chamber.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. An instrument for measuring the surface tension of a liquid, comprising a plurality of arms joined together to form a substantially open planar frame, an indicating scale carried by said arm frame, an elongated substantially planar rigid loop having an open center, said loop being fixed to one of said frame arms and extending longitudinally in a plane normal to the plane of said frame, and a highly flexible resilient filament fixed at one end to said frame, extending in the plane of said frame through said loop and with its free end movable opposite said indicating scale, whereby, when said frame and loop are dipped in a liquid and withdrawn, a first film of liquid is formed in said loop, a second film of liquid is formed in the space bounded by said filament, said frame and said first film, the surface tension in said film deflects said filament, and said filament indicates the deflection on said scale.

2. An instrument for measuring the surface tension of a liquid, comprising an open substantially planar rigid frame formed by three arms joined together at their ends, an indicating scale carried by said frame, an elongated substantially planar rigid loop having an open center, said loop being fixed to and extending from one arm of said frame substantially but not entirely across the frame to an adjacent arm, and a highly flexible resilient filament fixed near one angle of the triangular frame extending in the plane of said frame through said loop and with its free end movable opposite said indicating scale, whereby, when said frame and loop are dipped in a liquid and withdrawn, a first film of liquid is formed in said loop, and a second film in the space bounded by said filament, said frame and said first film, the surface tension in said second mentioned film deflecting said filament, and said filament indicating the deflection on said scale.

3. An instrument for measuring the surface tension of a liquid, comprising two arms joined together to form a V, an arcuate plate carrying an indicating scale secured to and extending between the spaced ends of said arms, said arms and said plate together forming a substantially planar open rigid frame, an elongated substantially planar rigid loop having an open center, said loop being fixed at one end only to one of said frame arms and extending longitudinally in a plane normal to the plane of said frame, and a highly flexible resilient filament fixed at one end near the junction of said arms, extending in the plane of said frame with its free end movable opposite the scale on said plate, said filament also extending through said loop, whereby when said frame and loop are dipped in a liquid and withdrawn, a first film of liquid is formed in said loop and a second film is formed in the space bounded by said filament, said frame and said first mentioned film, the surface tension in said second film deflecting said filament, and said filament indicating the deflection on said scale.

BERNARD VONNEGUT.

REFERENCES CITED

The following references are of record in the file of this patent:

UNITED STATES PATENTS

| Number | Name | Date |
| --- | --- | --- |
| 1,960,224 | Schoenberg | May 22, 1934 |
| 2,443,768 | Cassel | Sept. 7, 1948 |